United States Patent [19]
Koorn et al.

[11] Patent Number: 5,088,275
[45] Date of Patent: Feb. 18, 1992

[54] IMPLEMENT FOR PROCESSING MOWN CROP

[75] Inventors: Maarten Koorn, Vlaardingen; Sape Sikkema, Maasland, both of Netherlands

[73] Assignee: C. van der Lely N.V., Maasland, Netherlands

[21] Appl. No.: 742,102

[22] Filed: Aug. 5, 1991

Related U.S. Application Data

[62] Division of Ser. No. 236,747, Aug. 26, 1988, abandoned.

Foreign Application Priority Data

Aug. 28, 1987 [NL] Netherlands .................. 8702019

[51] Int. Cl.$^5$ ............................................. A01D 89/00
[52] U.S. Cl. ........................................ 56/364; 56/16.4; 460/122
[58] Field of Search ............... 56/372, 364, 400, 16.4, 56/DIG. 1; 460/122

[56] References Cited

U.S. PATENT DOCUMENTS

| | | | |
|---|---|---|---|
| 3,132,460 | 5/1964 | Spindler | 56/372 |
| 3,181,290 | 5/1965 | Van Der Lely | 56/372 |
| 3,188,789 | 6/1965 | Van Der Lely | 56/372 |
| 3,221,484 | 12/1965 | Van Der Lely | 56/370 |
| 3,225,531 | 12/1965 | Van Der Lely | 56/372 |
| 3,342,025 | 9/1967 | Van Der Lely | 56/372 |
| 3,447,294 | 6/1969 | Van Der Lely | 56/372 |
| 3,747,310 | 7/1973 | Calder | 56/1 |
| 4,094,132 | 6/1978 | Decoene et al. | 56/14.4 |
| 4,512,146 | 4/1985 | Klinner | 56/364 |
| 4,516,390 | 5/1985 | Klinner | 56/364 |
| 4,516,391 | 5/1985 | McLean | 56/16.4 |
| 4,660,362 | 4/1987 | Klinner | 56/364 |
| 4,671,050 | 6/1987 | Van Der Lely | 56/16.4 |

FOREIGN PATENT DOCUMENTS

| | | |
|---|---|---|
| 0014707 | 9/1980 | European Pat. Off. . |
| 0061230 | 9/1982 | European Pat. Off. . |
| 0065500 | 11/1982 | European Pat. Off. . |
| 0069160 | 1/1983 | European Pat. Off. . |
| 0076686 | 4/1983 | European Pat. Off. . |
| 0086458 | 8/1983 | European Pat. Off. . |
| 0116662 | 8/1984 | European Pat. Off. . |
| 0211658 | 2/1987 | European Pat. Off. . |
| 2815550 | 10/1979 | Fed. Rep. of Germany . |
| 7502442 | 8/1976 | Netherlands . |
| 0598743 | 5/1978 | Switzerland . |
| 0607841 | 11/1978 | Switzerland . |
| 375050 | 3/1973 | U.S.S.R. . |
| 2109662 | 6/1983 | United Kingdom . |
| 2132462 | 7/1984 | United Kingdom . |
| 2169184 | 7/1986 | United Kingdom . |
| 2172182 | 9/1986 | United Kingdom . |

Primary Examiner—Terry Lee Melius
Attorney, Agent, or Firm—Penrose Lucas Albright

[57] ABSTRACT

An implement for processing mown crop having a plurality of mower members and a crop processing member. The crop processing member has a hood and a carrier, to which are fitted tine-shaped elements by means of connecting members, that cooperate to process by crushing or crimping, the crop cut by the mowing members. The connecting members provide supporting walls on the side of the tine-shaped elements facing away from the side from which they are loaded during normal operation. The supporting wall encloses, at least at the upper portion of the connecting member, an angle with the tine-shaped element that permits the tine-shaped element, made at least partly of a synthetic resin material, to bend thereby absorbing the shock and lessening the potential for damage when solid objects are intermingled with the crop being processed.

19 Claims, 2 Drawing Sheets

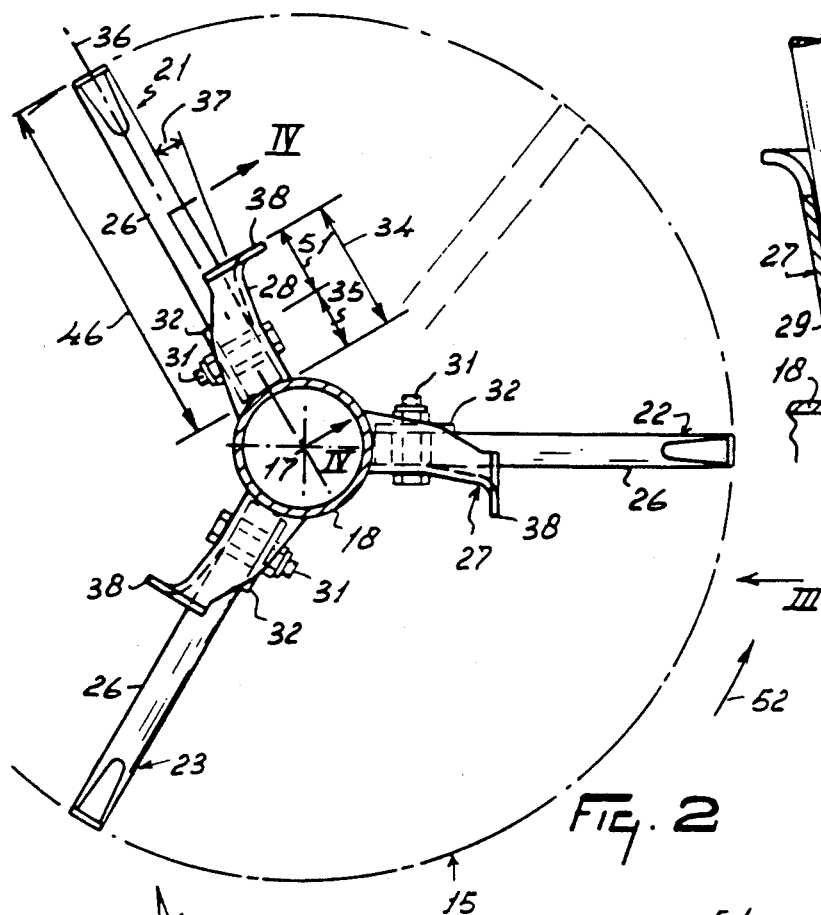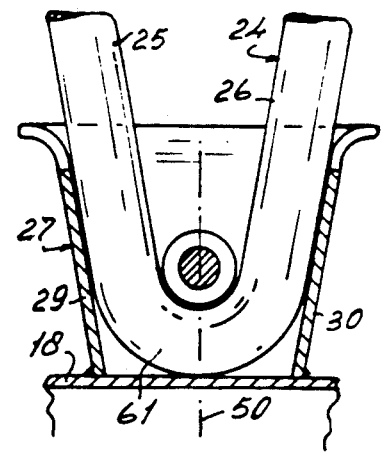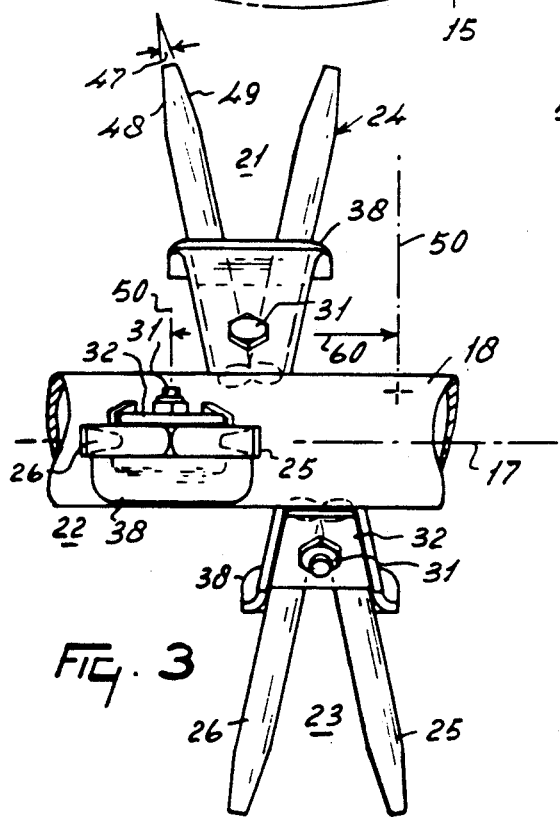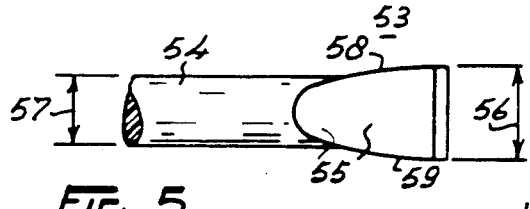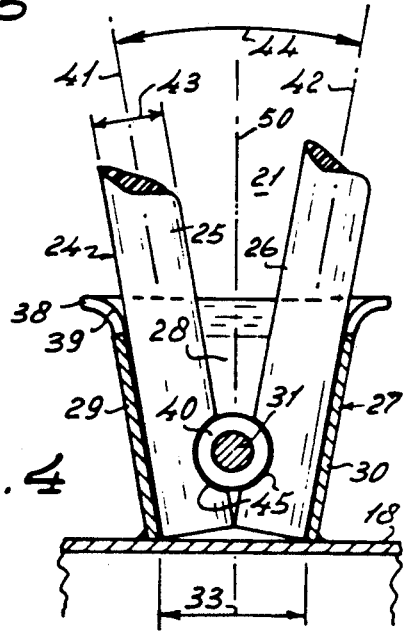

IMPLEMENT FOR PROCESSING MOWN CROP

RELATED APPLICATIONS

This is a continuation application of application Ser. No. 07/236,747, filed Aug. 26, 1988, now abandoned.

BACKGROUND OF THE INVENTION

The invention relates to an implement for processing mown crop, the implement comprising a processing member having a carrier to which there are fitted projecting, tine-shaped elements.

SUMMARY OF THE INVENTION

The invention has for its object to improve an implement of the above type.

According to the invention, this can be achieved by connecting the tine-shaped elements to the carrier via connecting members, the connecting members comprising supports in the form of supporting walls located at least at the side of the tine-shaped elements facing away from the side from which they are loaded during normal operation, the supporting wall incorporating, at least near the end remote from the carrier, an angle for deflection of the tine-shaped element which is made at least partly of a synthetic resin material.

In this situation, the tineshaped elements can be connected in an advantageous manner, which simplifies the manufacture of the implement. The supporting walls are a proper support for the plastic tines. The tines can advantageously unwind their load-induced bend along the supporting wall portions that enclose an angle with the tines when in the unloaded state. The plastic tines can deflect advantageously from their connection to the carrier. This provides an advantageous processing of the crop. If there are solid objects among the crop, the tines can deflect in order to avoid them, thus obviating a fracturing thereof. This renders the implement more reliable during operation and the processing action can be effected in an optimum manner.

An advantageous embodiment of the implement according to the invention is obtained when the supporting walls are connected to a central carrier of a processing member which is rotatable about a rotary axis, the tine-shaped elements being arranged such that they project at least substantially radially from the rotary axis of the processing member. In order to obtain an advantageous embodiment of the implement according to the invention, the tine-shaped elements are made of polyamide 6, for example, Nylon 6. A simple connecting member for connecting the tines to the carrier can be obtained when, according to the invention, the supporting wall is designed as a holder to which two tines are attached. The tines being clamped between the holder and a clamping member. An advantageous connection of the tines is obtained when the two tines extend along facing walls of the holder, a locking member being arranged between the tines to lock same against movement in their longitudinal direction relative to the holder.

A further advantage accrues where deflect in particular in response to impact loads produced by, for example, solid objects present in the crop. This result is obtained when the holder is provided, at its side wherefrom the tines project, with a turned-over supporting wall which extends in a curve and, taken in the normal rotational direction of the rotating processing member, is located at the rear side of the tines. An advantageous support of the tines is obtained when, in accordance with the invention, the supporting edge extends to as far as those sides of the two tines attached to the holder that are remote from each other, taken in a direction transversely to the normal rotational direction of the processing member. A preferred embodiment of the tines is obtained when the tines have a cross-section of approximately twenty millimeters. In accordance with the invention, the tine can be advantageously of a round cross-section having a diameter of approximately twenty millimeters.

For a better understanding of the invention and to show how the same may be carried into effect, reference will now be made, by way of example, to the accompanying drawings.

BRIEF DESCRIPTION OF THE DRAWINGS

FIG. 2 is, to an enlarged scale, a cross-sectional view of part of the implement according to the invention, taken on the line II—II in FIG. 1;

FIG. 3 is a view of part of the implement, taken in the direction of the arrow III in FIG. 2;

FIG. 4 is a cross-sectional view, taken on the line IV—IV in FIG. 2;

FIG. 5 is a view of a further embodiment of part of a tine according to the invention; and FIG. 6 is a view corresponding to FIG. 4 of a second embodiment of a group of tines.

DESCRIPTION OF THE PREFERRED EMBODIMENTS

Figure 1:
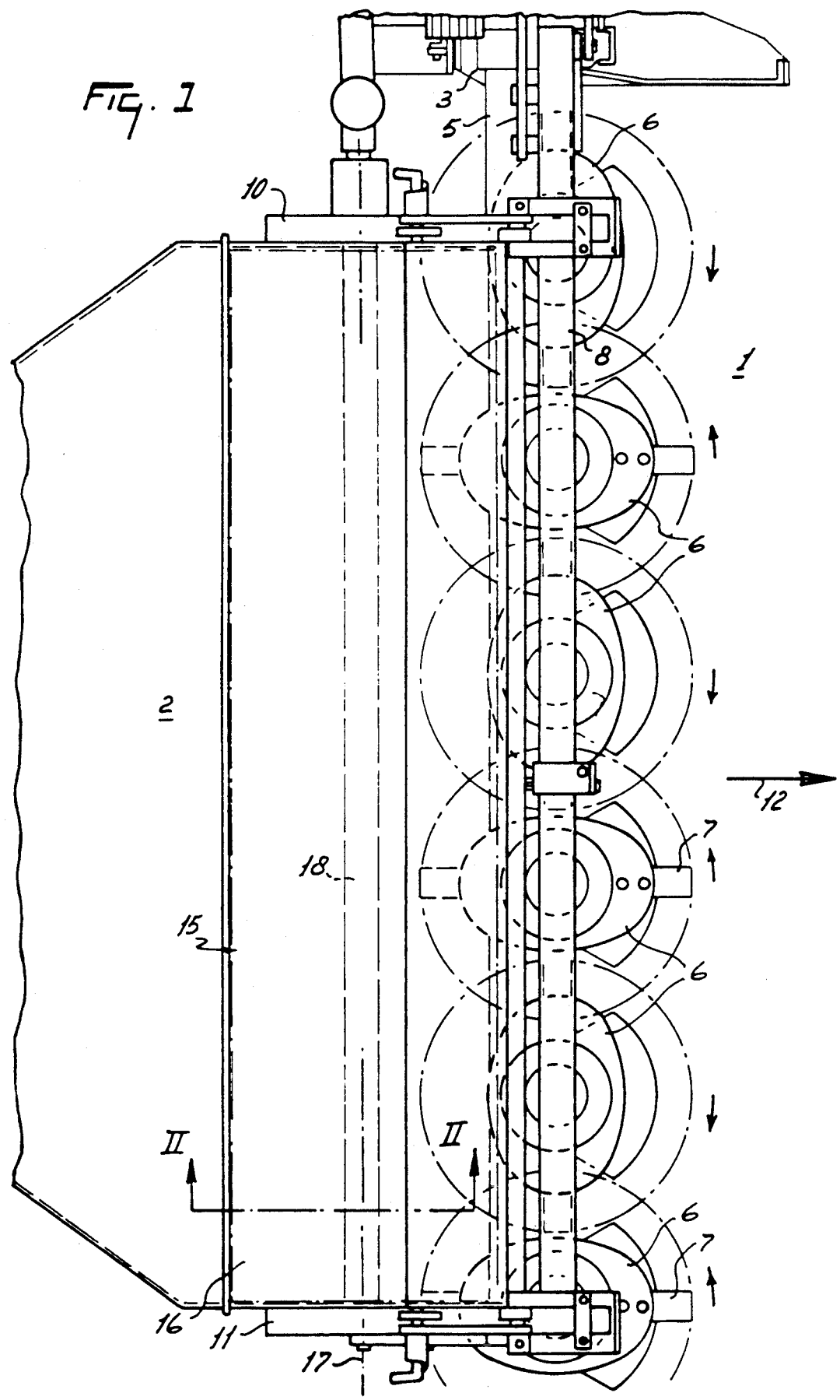
FIG. 1 is a plan view of an embodiment to the invention.

FIG. 1 is a schematic plan view of an implement according to the invention. The implement according to this embodiment is a mower-crusher implement comprised of a mowing implement 1 and a crop processing implement 2. A carrier device 3, by means of which the combination of the mowing implement 1 and the crop processing implement 2 can be connected to a tractor or a suchlike vehicle, is shown only in part.

The mowing implement 1 comprises a carrier beam 5 to which mower members 6 are arranged rotatably. The mower members 6 are located above the carrier beam 5 and are rotatable about upwardly extending rotary axes by means of transmission members mounted in the carrier beam 5. The mower members 6 comprise disc-shaped members to which are fitted two diametrically opposite knives 7. Above the row of mower members 6 there is arranged a frame beam 8 which is rigidly connected to the carrier beam 5 and together therewith is coupled pivotably to the carrier device 3. In this situation, the mower implement 1 can pivot relative to the carrier device 3 about a pivot axis (not shown in further detail) which extends in the normal direction of operative travel 12 of the implement.

On frame beam 8 there are arranged two carrier arms 10 and 11, to which the crop processing implement 2 is coupled. The crop processing implement 2 comprises a rotor-shaped member 15 and a hood 16 co-operating therewith. The rotor-shaped member 15 is coupled to the carrier arms 10 and 11 capable of rotation about a rotary axis 17 (FIG. 2). The rotor-shaped member 15 includes a centrally located rotor shaft 18 which, in this embodiment, consists of a tubular member centrically surrounding the rotary axis 17. Alternatively, the rotor shaft 18 may be of a different design.

The rotor-shaped member 15 comprises three sets of processing tines 21, 22 and 23. As is apparent in particular from FIG. 2, these sets 21 to 23 are fitted to the rotor shaft 18 with a uniform distribution around the rotary axis 17. The sets are arranged such around the rotary axis 17 that they are shifted through 120° relative to the adjacent set. Each set consists of a plurality of tine groups 24 which are spaced apart, taken in a direction parallel to the rotary axis 17. Each set is wound in a spiral around the rotary axis 17 along the length of the rotor shaft 18. In this embodiment, adjacent tine groups 24 of a set are staggered through approximately 50° around the rotary axis 17. Each tine group 24 comprises two tines 25 and 26 which project from rotary axis 17 are arranged in a V relative to each other so as to diverge as the distance from rotary axis 17 increases. The tines 25 and 26 constitute tine-shaped processing elements. Each tine groups 24 includes a tine support 27 which is rigidly attached to the rotor shaft 18. The tine support 27 is of a U-shaped cross-section having a bottom portion 28 and two upright sides 29 and 30. The tine support 27 constitutes a holder for the tines 25 and 26. The side walls 29 and 30 extend in the shape of a V corresponding to the V-shaped position of the tines 25 and 26, so that, taken in a direction away from the rotary axis 17, walls 29 and 30 diverge at an angle equal to that at which the tines 25 and 26 are arranged relative to each other. In this embodiment, the two tines are formed separately but are identical. Together, the two tines of a tine group are connected rigidly to the holder 27. In this situation, tines 25 and 26 are clamped tightly against the bottom 28 of the tine holder 27 by means of a single bolt 31 and a pressure plate 32. The bolt 31 is inserted between the tines 25 and 26, as shown in FIG. 4. The bolt 31 is surrounded by a bushing 40 which is tightly seated in recesses 45 provided in the facing sides of the tines 25 and 26. The tines 25 and 26 bear against the walls 29 and 30 of the tine holder 27 and at one end against the rotor shaft 18. The spacing 33 between the ends of the walls 29 and 30 that are contiguous to the rotor shaft 18 is such that the ends of the tines 25 and 26 contact each other. The pressure plate 32 is disposed between the walls 29 and 30 and, preferably, has its sides bearing against side walls 29 and 30. From the bottom 28 of the tine holder 27, the side walls 29 and 30 near rotor shaft 18, extend above the pressure plate 32 (FIG. 2). The tine holders 27 extend a distance 34 from the rotor shaft 18. The bottom 28 extends for distance 35 from the rotor shaft 18 parallel to a plane 36 which includes the rotary axis 17 and the center lines of the tines 25 and 26 of a group. The distance 35 is equal to approximately half the distance 34. Within the distance 35, the bolt 31 extends through an aperture in the bottom portion 28. The bottom portion 28 extends through distance 51, which, considered from the rotor shaft 18, is located beyond distance 35, at an angle 37 to the tines 25 and 26 (FIG. 2). Preferably, the angle 37 is more than approximately 4° and less than 15°. As in this embodiment, the angle 37 is preferably approximately 10°. The end of the tine holder 27 facing away from the rotor shaft 18 has outwardly folded edges 38 which extend from both the bottom portion 28 and the side walls 29 and 30. The upper edges of the side walls 29 and 30 extend, with respect to the bottom portion 28, slightly downwardly from the rotor shaft 18. The ends of side walls 29 and 30 that face away from the rotor shaft 18 are preferably positioned such that, taken from the bottom portion 28, they extend at least to near the plane 36.

The outwardly folded edges 38 are folded in accordance with a smooth curve 39. At the side facing the tines, curve 39 has a radius which is approximately ten millimeters.

The tines 25 and 26 are preferably straight, the center lines 41 and 42 thereof being located in the plane 36. The tines preferably have a cross-section of such a shape that the outer circumference thereof is located approximately centrically around center lines 41 and 42. In this embodiment, the tines are of a circular cross-section, but they may alternatively be, for example, an equilateral polygon, such as a square. The cross-sectional width of the tines is preferably more than fifteen millimeters and less than twentyfive millimeters. In this embodiment, the tines 25 and 26 have a cross-sectional width 43 of approximately twenty millimeters. The tines of each group of tines have their center lines 41 and 42 located in the plane 36. Adjacent tine groups of a set are shifted relative to each other around the rotary axis 17 for the purpose of distributing the tines optimally over the entire periphery of the rotor shaft 18. Depending on the length of the rotor shaft 18 and the number of groups of tines in a set, the adjacent tine groups are provided in shifted relationship through a wider or a smaller angle relative to each other around the rotary axis 17. In this embodiment there are six mowing members 6 having a total working width of 240 centimeters, the rotor shaft has a length of approximately 190 centimeters and each set of tine groups comprises fourteen tine groups which are distributed through 360° around the rotary axis 17. Adjacent tine groups of a set are shifted through approximately 51° relative to each other around the rotary axis 17. The tine groups 24 of the sets 21 to 23 are staggered relative to each other through a distance equal to that between the adjacent groups of one set divided by the number of sets (FIG. 3). The tines 25 and 26 of each group enclose an angle 44 of approximately 20° with each other. Alternatively, this angle may be chosen slightly differently, but preferably will not be more than approximately 30° and not be less than approximately 15°. The tines extend distance 46 from the rotor shaft 18, distance 46 being is approximately twenty-one centimeters in this embodiment. The tines extend approximately twenty-five centimeters from the rotary axis 17. The length 46 of the tines is approximately three times the distance 34 through which the tine holders 27 extend from the rotor shaft 18.

At their free ends, that is, the ends remote from the rotor shaft 18, the tines 25 and 26 taper slightly. The tapering ends are formed by two flat portions which are located diametrically opposite each other with respect to the center line 36 and enclose an angle 47 of approximately 10° between them. The planes 48 and 49, which are extensions of the two flat portions of the tines tapering ends, extend such that they are perpendicular to the plane 36.

The tines 25 and 26 are made of a synthetic resin material, preferably polyamide 6, for example, Nylon 6, so that the tines 25 and 26, partly because of their cross-section, have a degree of flexibility. This material, or a similar material, of which the tines are made has the advantage that its modulus of elasticity doubles over a temperature range of approximately 25°, that is, between approximately 30° C. and approximately 5° C.

The tines 25 and 26 of a set of a tine group extend symmetrically relative to a center plane 50 which extends perpendicularly to the rotary axis 17 and contains the center line of the connecting bolt 31. In this embodiment, the center plane 50 contacts the periphery of the tine ends located near the rotor shaft 18 in the region of the periphery thereof where they contact each other.

During use, the implement, according to the invention, is moved in the direction indicated by the arrow 12 by means of a tractor or a similar vehicle to which it is connected by for example, carrier device 3. During operation of the implement, the mower members 6 are caused to rotate in such a manner that the mowing knives 7 cut the crop in the field. Beam 5 located approximately parallel to the surface to be mown and, preferably, bears on the soil with part of the implement's weight. The mower members are induced to rotate in a desired direction. In this embodiment, adjacent mower members are induced to rotate in the opposite direction relative to each other, as indicated by arrows in FIG. 1. If so desired, the direction of rotation can be chosen differently. The crop cut by the mower members 6 moves over the mower members towards the rear, taken in the direction of operative travel 12. The crop processing implement 2 is arranged such that the rotor-shaped member 15, which during operation is caused to rotate, picks up the crop cut by the mower members 6 and processes same further in co-operation with the hood 16. During operation, the rotor-shaped member 15 is caused to rotate in the direction indicated by the arrow 52. When this direction of rotation is used, the tines near the bottom side of the rotor move in a direction identical to the direction of operative travel 12. The tines 25 and 26 of the rotor-shaped member 15 will pick up the crop near the rear sides of the mower members and lift same. The crop is then conveyed to the rear between the rotor-shaped member 15 and the hood 16 covering same to be, for example, deposited on the soil behind the implement 1. The rotor-shaped member 15 is caused to rotate at such a speed around the rotary axis 17 that it can process the crop in a predetermined manner in co-operation with the hood 16. The processing operation is effected substantially by the tines 25 and 26, while the hood 16 ensures that the crop remains in contact with the tines. The tines 25 and 26 will contact the crop at a given speed and, depending on the type of crop and the rotational speed of the rotor, will, for example, crush and/or crimp the crop with a greater or lesser intensity. So as to perform this processing operation in the appropriate manner, particularly in dependence on the quantity of crop to be processed per unit of time, the tines according to the invention are made of a comparatively flexible material. In this connection, it may be advantageous for the modulus of elasticity of the material to double within the temperature limits between approximately 50° C. to 30° Centigrade. When the crop is processed at higher temperatures, e.g. up to 20° or 30° Centigrade, temperatures which may occur on a summer's day, the flexibility of the tines will increase. Because of this increase in flexibility, the tines will be somewhat more elastic than at lower temperatures. Due to the increase in elasticity, the tines will bend slightly more easily and hence, particularly when large quantities of crop are being processed, they will crush or crimp the crop less forcefully. Thus at elevated temperatures, a forceful crushing and/or crimping of the crop will not be required to such an extent, as the higher temperatures can cause a better drying thereof. When, however, the processing is to be effected in the early morning hours when the temperature is lower on the average, then a more forceful crushing will be required. The flexibility of the material will decrease due to the lower temperatures, so that the tines can crush and/or crimp the crop more forcefully.

Because of their flexibility the tines can bend to some extent, so that the free ends thereof can move resiliently relative to the ends retained in the holder 27. The bending of the synthetic resin material tines can be effected advantageously in that the holder extends rearwardly through the distance 51 at the angle 37 (taken relative to the direction of rotation 52) and in that near its end the holder is provided with the edges 38 which are folded outwardly in accordance with the curve 39. The tine can bend rearwardly relative to the direction 52 under the pressure of the material to be processed or of a solid object present among the material. The tine can come to bear on a larger or smaller portion of the distance 51 of the tine support 27. This supporting action which increases on further bending through the distance 51 is advantageous to prevent damage to the synthetic resin material of the tine. For that purpose, the portion 35 is caused to merge smoothly into the portion of the tine support over distance 51. Also, the curve 39 helps prevent, on excessive bending of the synthetic resin material tine, damage to the tine by precluding incision of the synthetic resin material.

An advantageous embodiment is obtained when the curve 39 is bent in accordance with a radius of approximately ten millimeters. Preferably, this radius is not less than five nor not more than fifteen millimeters.

The flexibility of the tines 25 and 26 is substantially the same in all directions because they are approximately concentric around the center lines 41 and 42, respectively. Taken in the direction of rotation 52, the curves 39 are positioned such around the tines 25 and 26 that, when bent, these tines can be supported adequately in both a direction opposite to the direction of rotation 52 and in directions perpendicular thereto.

Since the tines 25 and 26 are identical, each tine can be mounted along either the wall 29 or wall 30. Preferably, the tines are provided with small recessed portions 45 to accommodate the bushing 40, thereby preventing a movement of the tines in a direction parallel to their longitudinal direction from the holder 27. The center plane 50 located halfway between the two tines 25 and 26 and containing the center line of the bolt 31 and extending perpendicularly to the axis of rotation 17 constitutes a symmetry plane for the portions of the connecting members located on both sides and by means of which the two tines of a group are fitted to the rotary shaft 18. These connecting members comprise the holder 27, which is connected rigidly to the rotary shaft 18, the pressure plate 32 and the bolt 31 with bushing 40.

By bevelling the tine ends remote from the rotary shaft by means of the faces 48 and 49, the tines become less wide, taken in the direction of rotation 52. This can influence the processing of the crop such that the crop can be crushed and/or crimped more easily. With the object of obtaining a desired intense or less intense crushing and/or crimping of the crop, the angle 47 and the length of the faces 48 and 49 may be chosen slightly differently than in the embodiment shown.

FIG. 5 shows a different embodiment of the free end of a tine according to the invention. In this embodiment, free end 53 of a tine 54 is bevelled at two facing sides to form bevelled portions 55. Near the free end of the tine, these bevelled portions 55 are of a width 56 which is larger than the thickness 57 of the tine. The tine is compressed to some extent between the two bevelled portions 55 and forms a bulge there, so that at the end there is produced a width 56 which exceeds the diameter 57 of the tine. Like in the previous embodiment, the bevelled portions 55 may enclose an angle 47. Thus, there may be obtained edges 58 and 59 which project to a greater or lesser extent and which are somewhat sharper and, hence, can crush and/or crimp the crop somewhat more intensively.

As was shown in particular in FIG. 3, the tine groups 24 of the three sets 21, 22 and 23 are arranged in a staggered relationship relative to each other. This achieves an adequate distribution of the tine-shaped elements constituting tines around the periphery of the rotor shaft 18. Acting thus, the crop conveyed by the rotor in the direction indicated by the arrow 52 is processed uniformly between the rotor-shaped member 15 and the hood 16. Depending upon the spacing between the tines, the angle 44 between the tines of a tine group 24 may be chosen in the direction parallel to the rotary axis 17 to be more or less wide so as to obtain a most favorable distribution of the ends of the tines along the circumference of the rotor-shaped body 15.

The use of the tines 25 and 26 of a synthetic resin material, for example, polyamide 6, has the advantage that consequently the rotor-shaped member 15 has a comparatively low weight, as synthetic resin material tines 25 and 26 are considerably lighter than tines made of, for example, metal, with the mower having a width of 2.40 meters, the rotor-shaped body 15 will normally be provided with three sets of tines, each comprising fourteen groups of tines. Because of the use of synthetic resin material tines and the lighter connecting members adapted thereto, the rotor-shaped body is lighter than when there are used corresponding metal tines with their associated connecting members. Therefore, in a mowing implement having a working width of 2.40 meters and the rotor-shaped body 15 having a corresponding width of approximately 190 centimeters, the rotor-shaped body is approximately forty kilograms lighter than a similar rotor-shaped body having metal tines.

As a result of the comparatively low weight of the rotor-shaped member 15, less energy will be required to cause it to rotate.

The groups of one set of tine groups are spaced apart by a distance 60 of approximately thirteen centimeters. However, the distance 60 may alternatively be chosen differently in order to provide the rotor with a higher or a lower number of tines. Preferably, the holders 27 are connected rigidly to the rotor shaft by a means such as welding. Thus, a simple construction is obtained whereby the rotor can be manufactured easily. The part of the connecting member constituted by the holder 27 and forming, along the distance 34, a supporting wall for the tine when the tine is bent, is preferably connected rigidly to the rotor shaft 18. The pressure plate or the clamping member 32 is a loose component part with respect to the rotor shaft. The mounting of the tines between the plate 32 and the holder 27 can be influenced advantageously by manufacturing the bushing 31 of a slightly compressable synthetic resin material, such as polyamide 6. When compressing the pressure plate 32 by the bolt, the bushing which may, for example, be one millimeter larger than the thickness 43 of the tines, is compressed. This increases its diameter somewhat and the bushing 31 will press the tines tightly against the walls 29 and 30. As a result thereof, the tines will be adequately secured during the use of the implement and the tines 25 and 26 of a group 24 will not become detached by the impact loads to which they may be subjected during operation of the implement. Although, preferably, the holder 27 constituting the supporting wall is connected rigidly to the rotor shaft 18 by means such as welding, the shaft acting as a carrier, it is in principle also possible to rigidly connect the clamping member 32, acting as a pressure plate, to the rotor shaft and to manufacture the supporting wall 27 as a loose component part with respect to the rotor shaft 18.

The connection of two individually formed tines which extend substantially radially with respect to the rotary shaft 17, such as the tines 25 and 26, has the advantage that the tines can all be identical to each other. The connection of the tines to the rotor shaft 18 can then be effected easily, it being possible for the holder 27 to be comparatively small. However, it is also possible to manufacture two tines of a group as one integral unit, as shown in FIG. 6. The tines 25 and 26 are then interconnected by a connecting bridge portion 61. The component parts corresponding to those of the previous embodiment are given the same reference numerals as in FIGS. 1 to 5. In the embodiment of FIG. 6, the walls 29 and 30 may be slightly further apart. If so desired, the angle 44 may be slightly smaller to keep the free ends of the tines 25 and 26 spaced apart by the same distance as in the previous embodiment.

The invention is not limited to the features described in the foregoing but also relates to all the details shown in the drawings, whether they have been described or not.

Having disclosed our invention, what we claim as new and to be secured by Letters Patent of the United States is:

1. An implement for processing mown crop comprising:
    a frame;
    a processing member, said processing member being attached to said frame; and
    a hood, said hood attached to said frame above said processing member wherein said processing member further comprises:
        a carrier;
        projecting, tine-shaped elements, said tine-shaped elements being connected to said carrier by means of connecting members, said connecting members mounted rigidly on said carrier comprising supports in the form of supporting walls located at least at the side of said tine-shaped elements facing away from the side from which they are loaded during normal operation, a portion of said supporting walls enclosing, at least near the end remote from said carrier, an angle with said tine-shaped elements contained therein; and a locking member arranged between said tine-shaped elements which is adapted to lock said tine-shaped elements against movement in their longitudinal direction relative to said carrier by pressing them tightly into a substantially rigid relationship against said supporting walls.

2. An implement as claimed in claim 1, wherein said supporting walls are connected to a central carrier of said processing member which is rotatable about a rotary axis, said tine-shaped elements being arranged such that they project at least substantially radially from the rotary axis of said processing member.

3. An implement as claimed in claim 2, wherein said tine-shaped elements constituting tines substantially comprise a material whose modulus of elasticity doubles at least approximately over a temperature difference of approximately 25° Centigrade.

4. An implement as claimed in claim 3, characterized in that the modulus of elasticity of said material doubles at least approximately between temperatures of approximately 50° C. to 30° Centigrade.

5. An implement as claimed in claim 3, characterized in that the tine-shaped elements are made of polyamide 6, such as Nylon 6.

6. An implement as claimed in claim 2 wherein the supporting wall is designed as a holder to which said tines are attached, said tines being clamped between said holder and a clamping member.

7. An implement as claimed in claim 1, wherein said locking member is positioned at least partly in recesses in facing sides of two separate tines.

8. An implement as claimed in claim 1, wherein said locking member extends between said holder and said clamping member.

9. An implement as claimed in claim 1, wherein said locking member is in the form of a bushing provided around a clamping bolt, said clamping bolt extends between apertures in said holder and in said clamping member.

10. An implement as claimed in claim 6 wherein said holder is provided at its side where the tines project therefrom with an outwardly folded supporting edge which extends in accordance with a curve and, taken in the normal rotational direction of the rotating processing member, is located at least at the rear side of the tines.

11. An implement as claimed in claim 10, wherein said supporting edge extends to as far as those sides of said two tines attached to said holder that are remote from each other, taken in a direction transverse to the normal rotational direction of said processing member.

12. An implement as claimed in claim 6 wherein said clamping member is positioned at the leading side of said tines, taken in the normal rotational direction of the rotating processing member.

13. An implement as claimed in claim 10 wherein said holder has a length which is approximately equal to one-third of the length of a tine.

14. An implement as claimed in claim 6 wherein said tine has a crosssection between approximately 12 millimeters and 28 millimeters and, preferably, is approximately 20 millimeters.

15. An implement as claimed in claim 14 wherein said tine has a round or a multi-sided, at least approximately equilateral cross-section.

16. An implement as claimed in claim 15, wherein the implement comprises said processing member and a mowing device, said mowing device further comprises a plurality of mower members which are rotatable about upwardly-extending rotary axes, said processing member being positioned near the rear side of said mower members, taken in the direction of normal operative travel of the implement.

17. An implement as claimed in claim 16 wherein the implement can be coupled to the lifting hitch of a tractor or suchlike vehicle by means of a carrier structure.

18. An implement as claimed in claim 17 wherein the rotatable said processing member is drivable from a power take-off shaft of the tractor or suchlike vehicle.

19. An implement in accordance with claim 1 wherein said tine-shaped elements are composed of polyamide (Nylon 6).

* * * * *